United States Patent [19]
Izumi et al.

[11] Patent Number: 6,076,624
[45] Date of Patent: *Jun. 20, 2000

[54] DRIVE LAYOUT FOR OFFROAD VEHICLE

[75] Inventors: Kazuhiko Izumi; Minoru Seto, both of Iwata, Japan

[73] Assignee: Yamaha Hatsudoki Kabushiki Kaisha, Shizuoka-ken, Japan

[ * ] Notice: This patent is subject to a terminal disclaimer.

[21] Appl. No.: 09/061,657

[22] Filed: Apr. 17, 1998

[30] Foreign Application Priority Data

Apr. 28, 1997 [JP] Japan ................................ 9-110609

[51] Int. Cl.⁷ .................................................. B60K 13/04
[52] U.S. Cl. .............................................................. 180/291
[58] Field of Search ..................................... 180/291, 292, 180/297, 374, 375, 376, 230; 474/13, 15, 17, 84, 86, 87

[56] References Cited

U.S. PATENT DOCUMENTS

| | | | |
|---|---|---|---|
| 4,574,652 | 3/1986 | Shichinohe et al. ...................... | 74/474 |
| 4,666,015 | 5/1987 | Matsuda et al. ......................... | 180/233 |
| 4,722,235 | 2/1988 | Kumazawa .............................. | 74/15.66 |
| 4,736,809 | 4/1988 | Kumazawa .............................. | 180/339 |
| 5,152,361 | 10/1992 | Hasegawa et al. ...................... | 180/230 |
| 5,515,940 | 5/1996 | Shichinohe et al. .................... | 180/376 |
| 5,699,872 | 12/1997 | Miyakawa et al. ..................... | 180/291 |

*Primary Examiner*—Brian L. Johnson
*Assistant Examiner*—Faye M. Fleming
*Attorney, Agent, or Firm*—Knobbe, Martens, Olson & Bear LLP

[57] ABSTRACT

A drive layout for an offroad vehicle. The vehicle has a frame, at least two wheels supporting the frame, and an internal combustion engine supported by the frame. The engine has at least one cylinder, a piston positioned in the cylinder and reciprocating along a first axis. The piston drives an output shaft of the engine which is arranged to drive at least one of the wheels through a transmission. The vehicle has a longitudinal centerline, with the output shaft of the engine extending transverse to the centerline. The transmission includes a main shaft driven by the output shaft by a belt extending along a second axis. The main shaft drives a drive shaft which extends parallel to the centerline and which is arranged to drive at least one of the wheels. The layout is arranged such that the first axis and second axis are positioned on opposite sides of the centerline.

13 Claims, 5 Drawing Sheets

DRIVE LAYOUT FOR OFFROAD VEHICLE

FIELD OF THE INVENTION

The present invention relates to an offroad vehicle. More particularly, the invention is a drive layout for such an offroad vehicle.

BACKGROUND OF THE INVENTION

Offroad vehicles or "ATVs" as they are commonly referred to are designed to be operated over rugged terrain. These vehicles are often operated on steep inclines and declines, on rough roads, and in mud and water.

These vehicles include a frame supported by wheels. In one common arrangement, the vehicle has four wheels. An internal combustion engine is used to power at least one, and most commonly all, of the wheels.

In this arrangement, a first drive shaft extends to a front axle and a second drive shaft extends to a rear axle. Each of these drive shafts extends generally parallel to a centerline of the vehicle extending in the front and rear directions.

The first and second drive shafts are driven by a crankshaft of the engine. The vehicle includes a transmission through which the first and second drive shafts are powered by the crankshaft.

It is very desirable for the engine and related drive train of the vehicle to have a compact arrangement. In particular, due to the conditions in which these vehicles are operated, a great deal of vehicle stability is desired. This stability is enhanced by providing the vehicle with a low center of gravity and a center of gravity which is near the center of the vehicle. In this manner, the vehicle is less likely to overturn.

To facilitate this goal, the engine is often arranged so that the crankshaft extends transverse to the longitudinal centerline of the vehicle. In this arrangement, the center of gravity of the engine is near the centerline of the vehicle, and the periphery of the engine does not extend far from this centerline.

On the other hand, this arrangement has the drawback that the rotation of the crankshaft must be transmitted to the first and second drive shafts which are arranged transverse to the crankshaft. The transmission is thus larger than when the engine is arranged with its crankshaft extending parallel to the drive shafts, with the transmission extending to one side of the vehicle some distance, offsetting some of the benefits realized by positioning the engine transverse.

It is an object of the present invention to provide an offroad vehicle with an engine having a transversely extending crankshaft, where the vehicle has a compact drive layout.

SUMMARY OF THE INVENTION

The present invention is a drive layout for a transmission of an offroad vehicle. The offroad vehicle has a frame which is supported by at least two wheels.

An internal combustion engine supported by the frame. The engine has at least one cylinder, a piston positioned in the cylinder and reciprocating along a first axis. The piston drives an output shaft of the engine which is arranged to drive at least one of the wheels through a transmission. The vehicle has a longitudinal centerline, with the output shaft of the engine extending transverse to the centerline.

The transmission includes a main shaft driven by the output shaft by a belt extending along a second axis. The main shaft drives a drive shaft which extends parallel to the centerline and which is arranged to drive at least one of the wheels.

The layout is arranged such that the first axis and second axis are positioned on opposite sides of the centerline.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
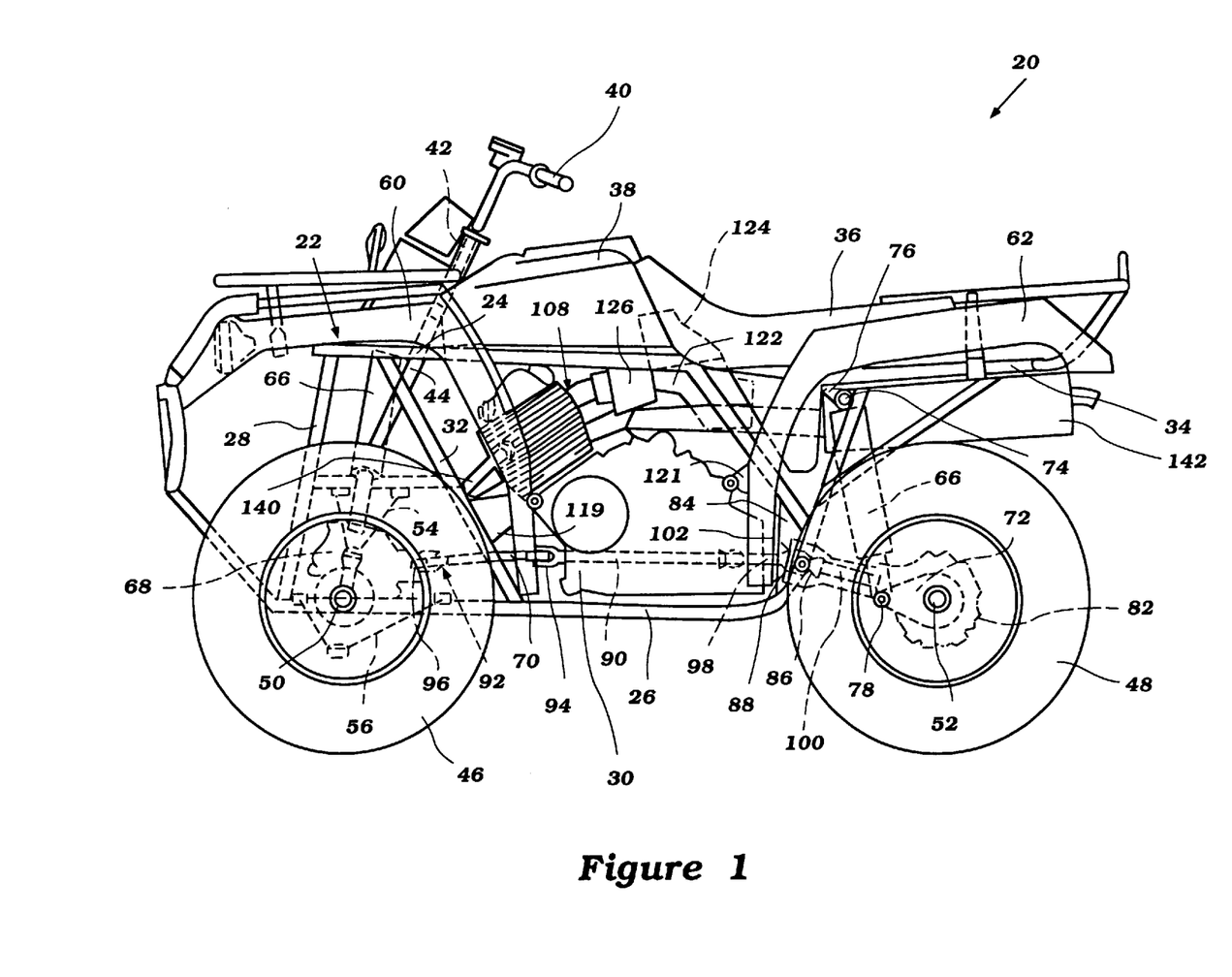
FIG. 1 is a side view of an offroad vehicle powered by an engine and having a drive layout in accordance with the present invention.

The present invention is a drive layout for a offroad vehicle 20. Referring to FIG. 1, the offroad vehicle 20 comprises an all-terrain vehicle or "ATV." While the drive layout of the present invention is described with this particular type of vehicle, those of skill in the art will appreciate that the invention may have utility in a wide range of applications.

The vehicle 20 has a tubular, open type frame 22. This frame 22 includes a pair of horizontally spaced-apart upper tubes 24. A rear end of each of these tubes 24 is directly connected to a respective lower tube 26. A front end of each of the upper tubes 24 is connected to its respective lower tube 26 via a reinforcing strut 28. At the front end of the vehicle 20 the tubes 24,26 are spaced some distance apart vertically by the struts 28, while at the rear end they converge, thus defining therebetween an open area in which is positioned an engine 30.

An angled strut 32 also extends between each upper and lower tube 24,26 near the front of the vehicle 20. Each of these struts 32 generally extends rearwardly from the upper to the lower tube 24,26.

Past their connection with the upper tubes 24, the lower tubes 26 bend upwardly to a connection with seat rails 34. The seat rails 34 are generally horizontally extending at approximately the same height as the main portion of the upper tubes 24.

The frame 22 may have a variety of constructions, with that described above being but one arrangement. The individual struts and tubes are preferably constructed of metal, and connecting by welding or other connections as well known in the art. As illustrated, the frame 22 includes a variety of other support elements which are not described in detail, as they form no portion of the invention herein and are well known to those of skill in the art.

A seat 36 is supported by the seat rails 34 and the upper tubes 24. The seat 36 is positioned to the rear of a fuel tank 38 which is also supported by the upper tubes 24, but close to a steering handle 40 positioned to the front of the fuel tank 38.

The steering handle 40 is mounted to an upwardly extending steering shaft 42. The steering shaft 42 is mounted for rotation within a steering tube 44. The handle 40 is connected to the first end of the steering shaft 42, while the opposite end of the steering shaft 42 is coupled to an appropriate steering mechanism for steering a pair of front wheels 46.

Figure 2:
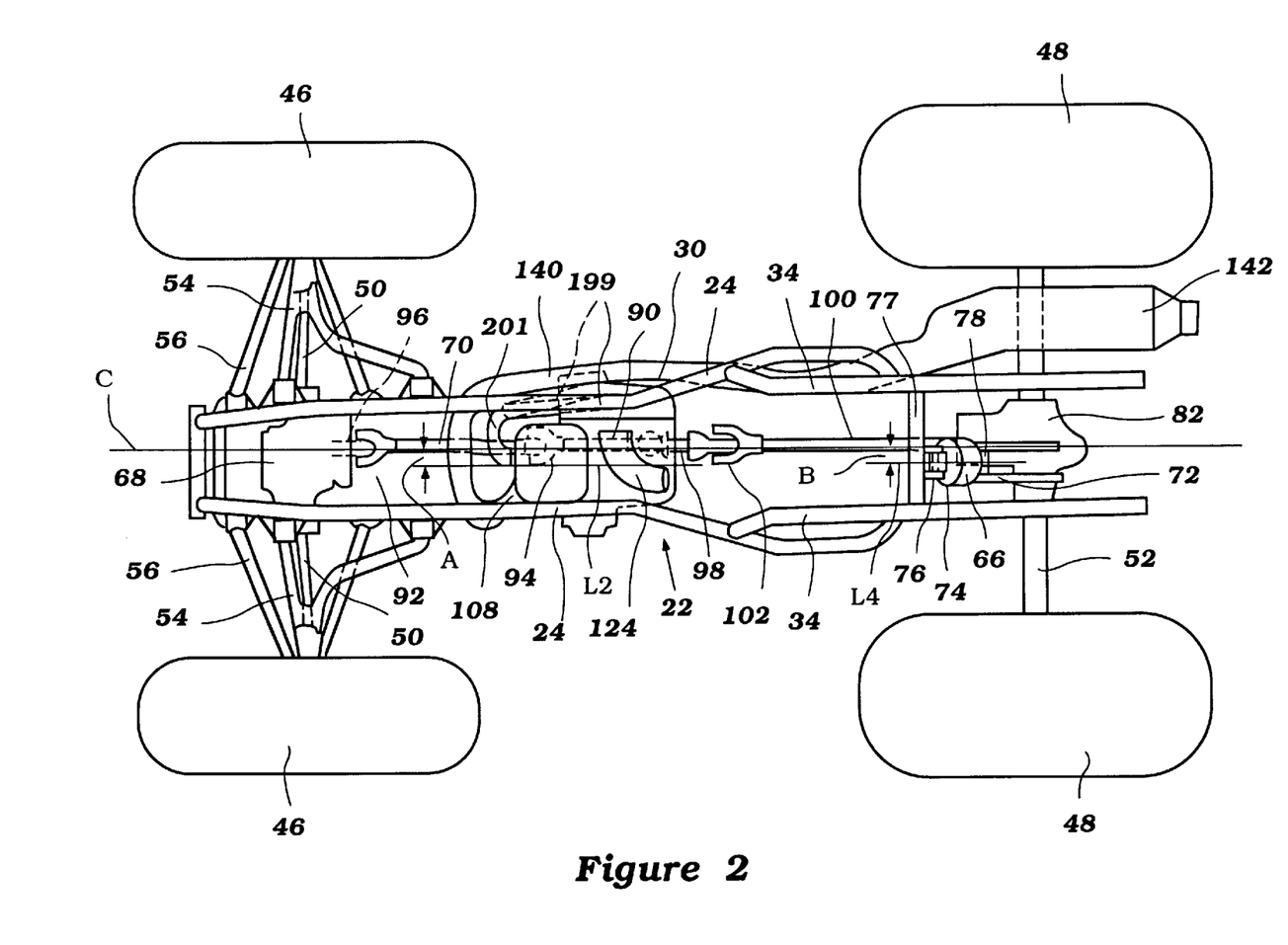
FIG. 2 is a top view of the offroad vehicle illustrated in FIG. 1 with portions thereof removed to expose a frame and drive layout thereof.

Referring to FIGS. 1 and 2, the frame 22 is rollably supported by the pair of front wheels 46 and a pair of rear wheels 48. Each front wheel 46 is mounted to a front axle 50, while the rear wheels 48 are mounted to a rear axle 52. As illustrated in FIG. 2, a longitudinal centerline C extends through the center of the vehicle (i.e. midway between its sides) from front end to rear end. The front and rear axles 50,52 extend transverse to this centerline C.

As best illustrated in FIG. 2, each front wheel 46 is supported by an upper arm assembly 54 and a lower arm assembly 56. The lower arm assemblies 56 extend outwardly from the lower tubes 56, while the upper arm assemblies 54 extend outwardly from a cross-brace 58 extending between the support strut 28 and the angled strut 32.

A somewhat "C"-shaped front fender 60 extends from generally behind each front wheel 46 over the top thereof towards the front end of the vehicle 20. Likewise, a rear fender 62 extends from generally in front of each rear wheel 48 over the top thereof towards the rear of the vehicle 20. The front and rear fenders 60, 62 are preferably constructed of a light-weight, corrosion resistant material such as a resin or plastic, and are mounted to the frame 22.

The front wheels 46 are mounted for movement up and down with respect to the frame 22. As such, the connections of the upper and lower arm assemblies 54,56 to the frame 22 are moveable. A shock, strut or similar energy absorbing member 66 is provided between the frame 22 and the supporting structure for each front wheel 46. The shocks 66 are arranged to dampen the upward and downward movement of the wheel 46, as well known to those of skill in the art.

In the arrangement illustrated, there are a pair of front axles 50. Each front axle 50 extends between its respective front wheel 46 and a front differential 68, permitting individual movement of the wheels 46 with respect to one another. The front differential 68 is arranged to transmit power from a front drive shaft 70 (described in greater detail below) to each of these axles 50, the axles 50 extending transverse to the drive shaft 70. This type of differential is well known to those of skill in the art.

In the embodiment illustrated, there is but a single rear axle 52 to which both of the rear wheels 48 are mounted. The rear wheels 48 are also mounted for vertical movement with respect to the frame 22. In this regard, at least one shock 66 is provided between the frame 22 and a bracket 72 supported by the axle 52.

At a top end, the shock 66 is mounted by a shaft or pin 74 which is connected to the shock 66 and extends through a pair of spaced brackets 76. These brackets 76 are supported by a cross-brace 77 extending between the seat support tubes 34. Likewise, the bottom end of the shock 66 is mounted by a similar pin 78 to a pair of spaced brackets 80. Preferably, the shock 66 is mounted so that a central axis L4 thereof is offset by an amount "B" from the centerline C of the vehicle 20.

Because the rear axle 52 is movably mounted to the frame 22, the drive mechanism for the rear wheels 48 is pivotally mounted. As illustrated, a rear differential or gear box 82 is supported by the axle 52 and a rear trailing arm 86. The forward end of this trailing arm 86 is mounted to an arm bracket 89 connected to the frame 22. The forward end of the arm 86 is connected to this bracket 89 about a horizontal pivot shaft 88.

As illustrated generally in FIGS. 1 and 2, the engine 30 drives a main output shaft 90. At a front end, the output shaft 90 is coupled to the front drive shaft 70 by a universal joint 94. The front drive shaft 70 extends to a universal joint 92 which couples it to an input shaft 96 associated with the front differential 68.

At its rear end, the output shaft 90 drives a rear drive shaft 98. This rear drive shaft 98 is coupled to an input shaft 100 via a universal joint 102 at the pivot mount of the rear trailing arm 86. The input shaft 100 extends to the rear differential 82, where the rotation thereof is transmitted to the rear axle 52, turning the rear wheels 48.

The manner by which the engine 30 powers the output shaft 90, and thus the front and rear wheels 46,48, will be described in greater detail below.

The engine 30 will be described with reference primarily to FIGS. 3 and 4. As illustrated, the engine 30 is of the internal combustion type, having a single cylinder and operating on a four-cycle principle. Those of skill in the art will appreciate that the engine 30 may have more than one cylinder and operate in accordance with other cycles, such as, a two-cycle principle.

The engine 30 has a cylinder block 104 having a cylinder head 106 connected to a top end thereof. The cylinder block 104 and head 106 cooperate to define a single cylinder 108.

A piston 110 is movably mounted in the cylinder 108. A top end of the piston 110 cooperates with the cylinder 108 to define a combustion chamber 112 portion thereof. The piston 110 is connected via a connecting rod 114 to a crankshaft 116. As illustrated in FIG. 2, a line L2 passing through the center of the cylinder is offset from the centerline C of the vehicle 20 by an offset amount A.

The crankshaft 116 is mounted for rotation within a crankcase 118. The crankcase 118 is defined by a crankcase cover 120 connected to an opposite end of the cylinder block 104 from the cylinder head 106.

As illustrated in FIG. 1, the engine 30 is supported by the frame 22 by a first pair of brackets 119 extending from the angled strut 32 to a connection with a front portion of the engine 30, and a second pair of brackets 121 extending from the upper tubes 24 to a rear portion of the engine 30.

Referring to FIGS. 1 and 2, air is supplied to the combustion chamber 112 through a suitable intake system. Air is drawn through an intake duct 124 and routed to an air cleaner 122. Air is routed from the air cleaner 122 to the engine 30. The intake duct 124 is preferably positioned under the seat 36 to reduce the occurrence of water and other material from being drawn into the intake system.

Preferably, fuel is added to the air passing through the intake system. As illustrated, a carburetor 126 is positioned along the intake system. Fuel is supplied to the carburetor 126 from the fuel tank 38, and delivered thereby to the air. The manner by which carburetors operate and their construction is well known in the art. Those of skill in the art will also appreciate that the fuel may be injected with a fuel injector, either directly or indirectly.

Referring again to FIG. 4, the air and fuel mixture which is supplied to the engine 30 selectively flows to the combustion chamber 112 through an intake port as controlled by a valve or similar mechanism. Preferably, this valve is operated by a camshaft 128. The camshaft 128 is mounted for rotation under a cylinder head cover 130 mounted to the top of the cylinder head 106.

Means are provided for rotating the camshaft 128. Preferably, this means includes a sprocket 132 is mounted to the camshaft 128. This sprocket 132 is driven by a cam chain 134 or other flexible transmitter (such as a belt) which extends through a chamber formed by the cylinder block 104 and head 106 from the crankcase chamber 118. The cam chain 134 is drive by a cam chain drive gear 136 mounted on the crankshaft 116. Those of skill in the art will appreciate that other camshaft drive means, such as gears, may be used.

A suitable ignition system is provided for igniting the air and fuel mixture which is supplied to the combustion chamber 112. This ignition system includes a coil 138 mounted at the end of the crankshaft 116 which provides electric power to an ignition coil, which is selectively discharged to a spark plug having its electrode positioned in the combustion chamber 112.

The products of combustion are selectively routed from the combustion chamber 112 through an exhaust port as controlled by an exhaust valve. This exhaust valve is preferably also operated by the camshaft 128.

Exhaust which flows through the port flows into an exhaust pipe 140 which leads to a muffler 142 positioned at the rear of the vehicle 20. The exhaust is discharged from the muffler 142 to the atmosphere.

The movement of the piston 110 turns the crankshaft 116. The motion of the crankshaft 116 is used to drive the output shaft 90, and thus the wheels 46,48. The movement of the crankshaft 116 is transmitted to the output shaft 90 by a transmission 144 having a drive layout in accordance with the present invention.

The drive layout of the transmission will be described with reference to FIGS. 3–5. The transmission 144 is located in a transmission chamber 146 defined by a transmission cover 148 connected to the crankcase cover 120. The transmission cover 148 is preferably removably connected to the crankcase cover 120 with one or more fasteners, such as a bolt.

The crankshaft 116 is supported for rotation within the crankcase 118 by first and second main bearings 152,154. The main bearings 152,154 are supported by the crankcase cover 120.

Figure 4:
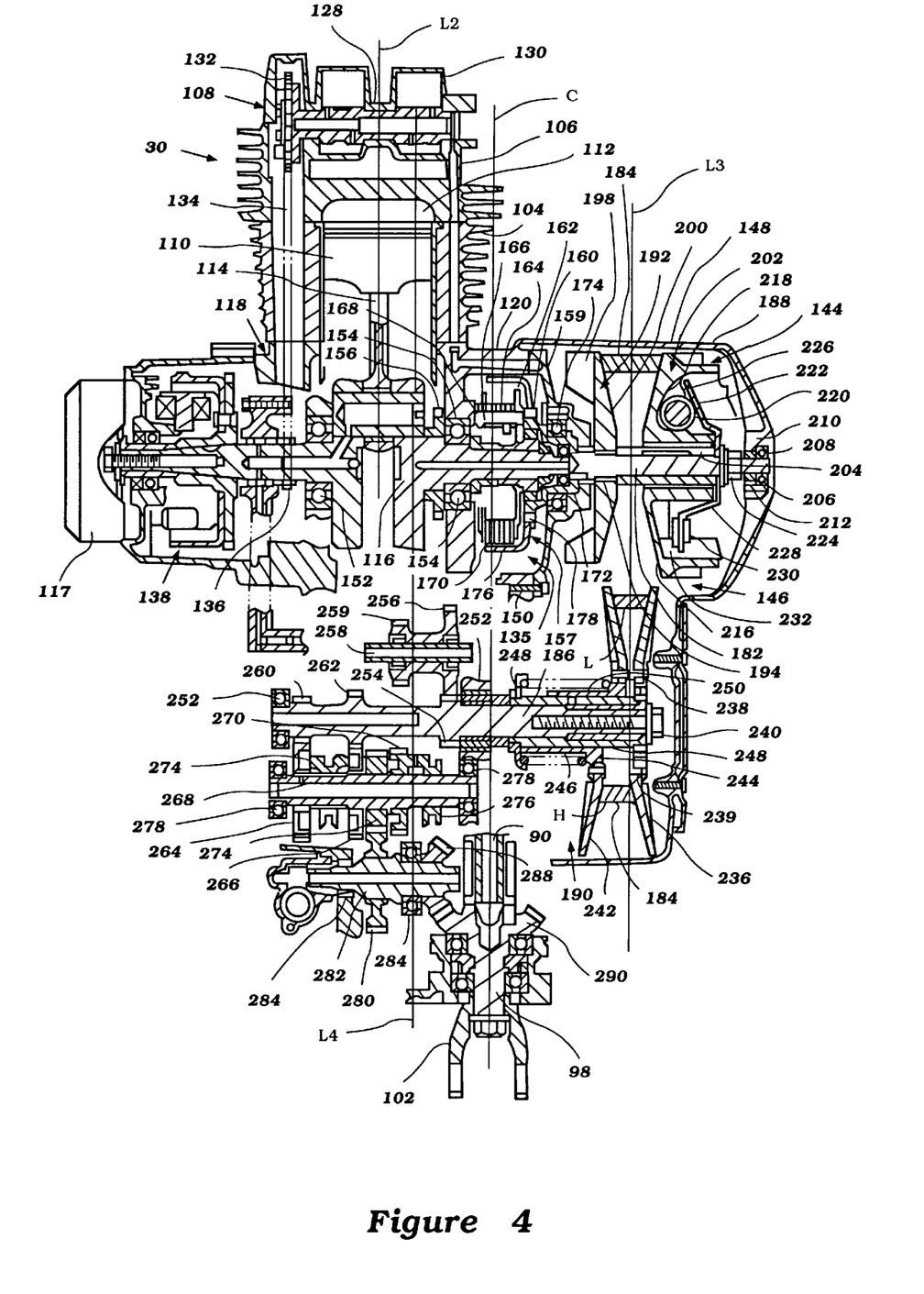
FIG. 4 is a cross-sectional view of the engine and transmission illustrated in FIG. 3 taken along line 4—4 therein.

An electric starter 117 is provided at one end of the crankshaft 116, as illustrated in FIG. 4. Preferably, this starter 117 is powered by an electric source and activated by a start button mounted near the steering handle 40 of the vehicle 20.

Figure 5:
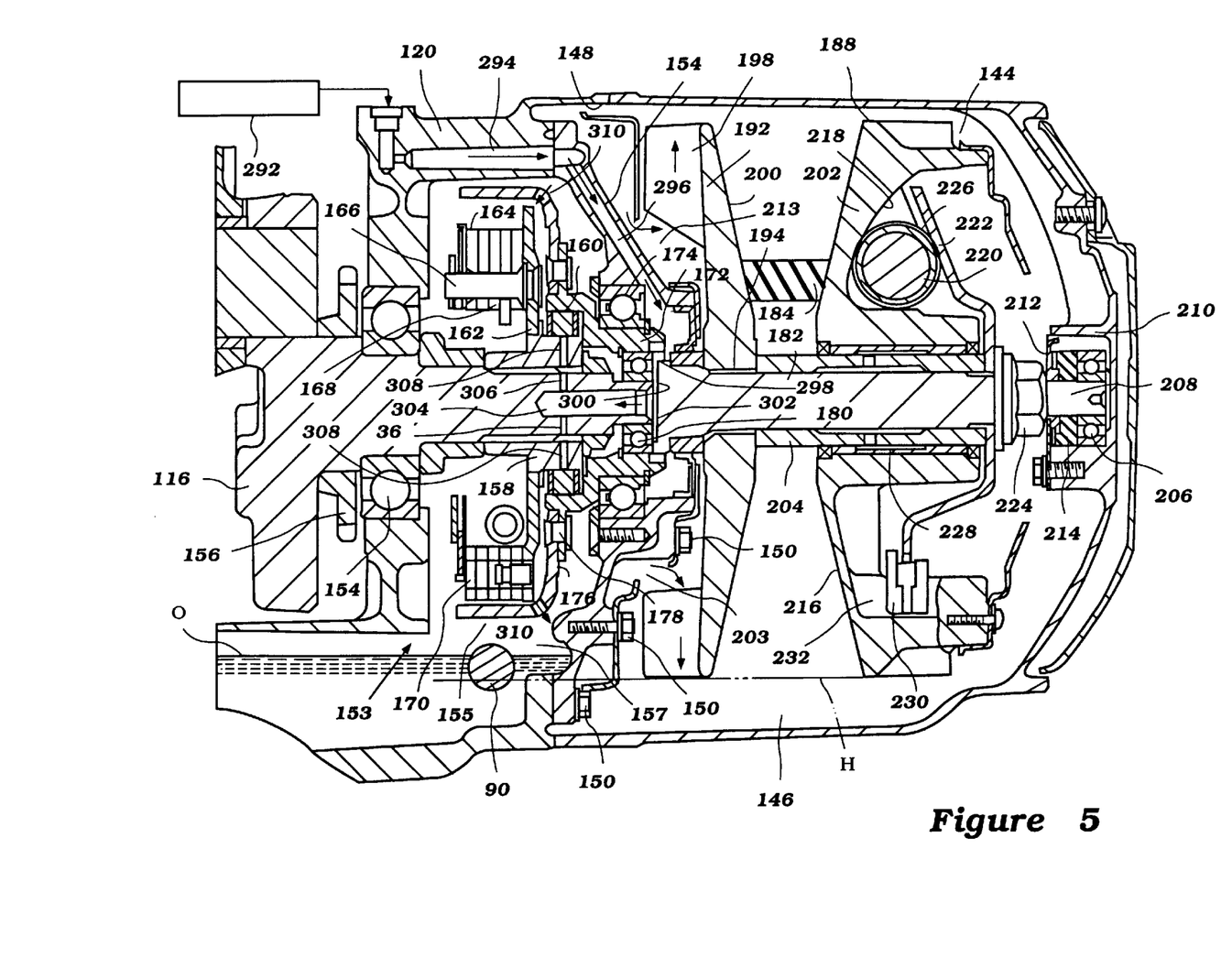
FIG. 5 is an enlarged cross-sectional view of a driveside of the transmission illustrated in FIG. 4.

As illustrated in FIG. 5, the transmission 144 is driven off of an end of the crankshaft 116 generally opposite the starter 117. A balancer drive gear 156 is positioned on the crankshaft 116 near the second main bearing 154. The purpose of this gear 156 is described in more detail below.

The transmission 144 includes a clutch 153. In the embodiment illustrated, the clutch 153 includes a centrifugal clutch 155 which is mounted in a clutch chamber 157. The clutch chamber 157 is defined by the crankcase cover 120 and a dividing wail 159. In the embodiment illustrated, the dividing wall 159 is supported by the crankcase cover 120, and includes at least one portion which may be disconnected therefrom by removing one or more fasteners, such as a bolt 150.

A clutch input shaft 158 is connected to an end of the crankshaft 116 which extends beyond the second main bearing 154. An inner plate 162 extends from the clutch input shalt 158. A weighted shoe element 164 is supported by a pin 166 connected to a first end 168 of the plate 162. The pin 166 is arranged to rotate, whereby the shoe element 164 moves between an extended position and retracted position. A similar shoe element is mounted at an opposite end 170 of the plate 162. The shoe elements 164,170 are arranged to selectively drive a clutch plate 176, described in more detail below.

The clutch 153 also includes a one-way clutch 160 which is connected to the input shaft 158 and spaced from the plate 162. The one-way clutch 160 is positioned between the input shaft 158 and a clutch output shaft 172. This clutch 160 serves to permit driving rotation of the output shaft 172 with respect to the input shaft 158 in only one direction. In particular, the clutch 160 is arranged to engage only when the speed of the output shaft 172 is greater than that of the input shaft 158. This one-way clutch 160 may comprise a sprag-type clutch.

The output shaft 172 is supported on its exterior for rotation with respect to the dividing wall 159 by a third bearing 174. The shaft 172 also supports a clutch plate 176. The clutch plate 176 extends radially outward from the shaft 172 and is connected thereto with one or more rivets 178 or other fasteners. A fourth bearing 180 is provided on the outside of the end of the crankshaft 116 but inside of the output shaft 172. This bearing 180 rotatably supports the output shaft 172 from the inside.

The shoe elements 164,170 are arranged to selectively engage the clutch plate 176. In the position of the shoe elements 164,170 as illustrated by the first shoe element 164, when the engine speed is low, the shoe elements 164,170 do not contact the plate 176 and thus do not drive the plate 176 (and the connected output shaft 172). If the speed of the vehicle 20 is low (or not moving), then the crankshaft 116 does not drive the output shaft 172. If the speed of the engine 30 is high, then the shoe elements 164,170 move to the position as illustrated by the second shoe element 170, where the shoe elements 164,170 engage the plate 176. At that time, the crankshaft 116 drives the output shaft 172 through the centrifugal clutch 155.

If at any time the speed of rotation of the output shaft 172 is higher than that of the engine 30 (i.e. input shaft 158), then the one-way clutch 160 engages. When this clutch 160 engages, the speed of rotation of the output shaft 172 is slowed by its connection to the slower input shaft 158, and engine braking of the vehicle occurs.

A primary shaft 182 is selectively driven by the output shaft 172 through the clutch 155. As illustrated in FIG. 3, the primary shaft 182 extends in alignment with the crankshaft 116 along an axis O1. This axis O1 is transverse or perpendicular to the centerline C of the vehicle 20.

Lubricant is supplied to the clutch 153. As illustrated, a lubricant pump 292 delivers lubricant through a passage 294 in the transmission cover 148. This passage 148 leads to a passage 296 in the dividing wall 159. The passage 296 through the dividing wall 159 terminates in an oil chamber 298 defined between an end surface 300 of the crankshaft 116 and the adjacent end surface 302 of the primary shaft 182.

Oil then flows through a passage 304 leading into the end of the crankshaft 116. A pair of passages 306 extend radially outward from this passage 304 to a pair of aligned connecting passage 308 through the clutch input shaft 158. These connecting passages 308 extend outwardly to the one-way clutch 160 for lubricating it.

The oil or lubricant then flows downwardly towards the bottom of the clutch chamber 157 to an oil pool O (from which the pump 292 draws oil). This oil passes through ports 310 in the clutch plate 176.

The primary shaft 182 is arranged to drive a "V"-belt 184 or similar drive means or another type of flexible transmitter (such as a chain, for instance. which is used to drive a main shaft 186, described in more detail below. In this regard, the transmission 144 has a drive side 188 and a driven side 190. The transmission 144 is provided with a drive and driven side 188,190 for the reason that this arrangement permits the engine 30 to drive the wheels 46,48 at more than speed ratio, and so that the motion of the crankshaft 116 may be transmitted to the main output shaft 90, which as illustrated in FIG. 3 is offset some distance therefrom.

A first drive sheave 192 is mounted upon the primary shaft 182. This sheave 192 is fixed in position on the shaft 182 by one or more splines 194. The first sheave 192 has a generally flat surface 196 which faces in the direction of the crankshaft 116. The first sheave 192 has an opposing conical surface 200.

One or more fins 198 preferably extend outwardly from this surface 196. These fins 198 move air through the transmission chamber 146 for cooling the "V"-belt 184. Referring to FIG. 2, air is preferably drawn into the chamber 146 through a port (not shown) by the movement of the fins 198 and exhausted therefrom through a pair of exhaust passages 199 leading to a single pipe 201 having a discharge.

A second sheave 202 is movably mounted on a collar 204 extending over the shaft 182. This sheave 202 is spaced some distance from the first sheave 192.

As illustrated, the primary shaft 182 is supported at its end 208 opposite the crankshaft 116 by a support bearing 206. This bearing 206 is supported by a mount part 210 of the transmission cover 148.

The support bearing 206 is mounted in sealed fashion within the mount part 210. A cover 212 is provided over than portion of the open end of the mount part 210 not occupied by the shaft end 208. A seal 214 is provided between the cover 212 and the bearing 206.

As described above, the second sheave 202 is mounted on the primary shaft 182 so as to be movable therealong (i.e. along the axis O1). The second sheave 202 has a conical surface 216. This surface 216 faces the conical surface 200 of the first sheave 192. The "V"-belt 184 is engaged on either side by these conical surfaces 200,216.

The opposing side of the second sheave 202 defines a cam surface 218. A centrifugal weight 220 engages this surface 218. The weight 220 is positioned in an area defined by the surface 218 and a cam plate 222. The cam plate 222 is mounted between the second sheave 202 and the end 208 of the primary shaft 182. As illustrated, the cam plate 222 abuts the end of the collar 204 and is maintained in that position with a nut 224 which is positioned on the shaft 182.

The cam plate 222 has a sloping surface 226 which engages the weight 220 opposite that which the cam surface 218 of the second sheave 202 engages. This surface 226 slopes in the direction towards (i.e. gets closer to) the sheave 202 moving radially outward from the shaft 182.

The cam plate 222 has a portion generally opposite that portion which defines the sloping surface 226 on which is mounted a slider 230. The slider 230 is positioned within a guide part 232 defined by the second sheave 202. Mounting of the slider 230 within the guide part 232 causes the cam plate 222 to rotate with the second sheave 202 at the same speed.

A bushing 228 is provided between the second sheave 202 and the collar 204. This bushing 228 defines a chamber which is in communication with a fluid passage leading from a chamber defined outside the primary shaft 182 by the collar 204. Lubricant, such as grease, may be provided through this passage into the chamber.

In accordance with this arrangement, when the clutch 155 is engaged and the engine 30 is turning the crankshaft 116 at low speed, the primary shaft 182, and thus the first and second sheaves 192,202 rotate at a low speed. At this time, the second sheave 202 is biased by the weight 220 so that it is positioned along the primary shaft 184 closest to its end 208.

When the engine speed increases, and thus the rotational speed of the sheaves 192,202 increases, the centrifugal weight 220 moves radially outward, riding on the cam surface 218 and sloping surface 226. The movement of the weight 220 (because the plate 222 is fixed) causes the second sheave 202 to move towards the first sheave 192 along the primary shaft 182. As the distance between the first and second sheaves 192,202 decreases, the "V"-belt 184 is moved radially outwardly along the conical surfaces 200, 216.

Figure 3:
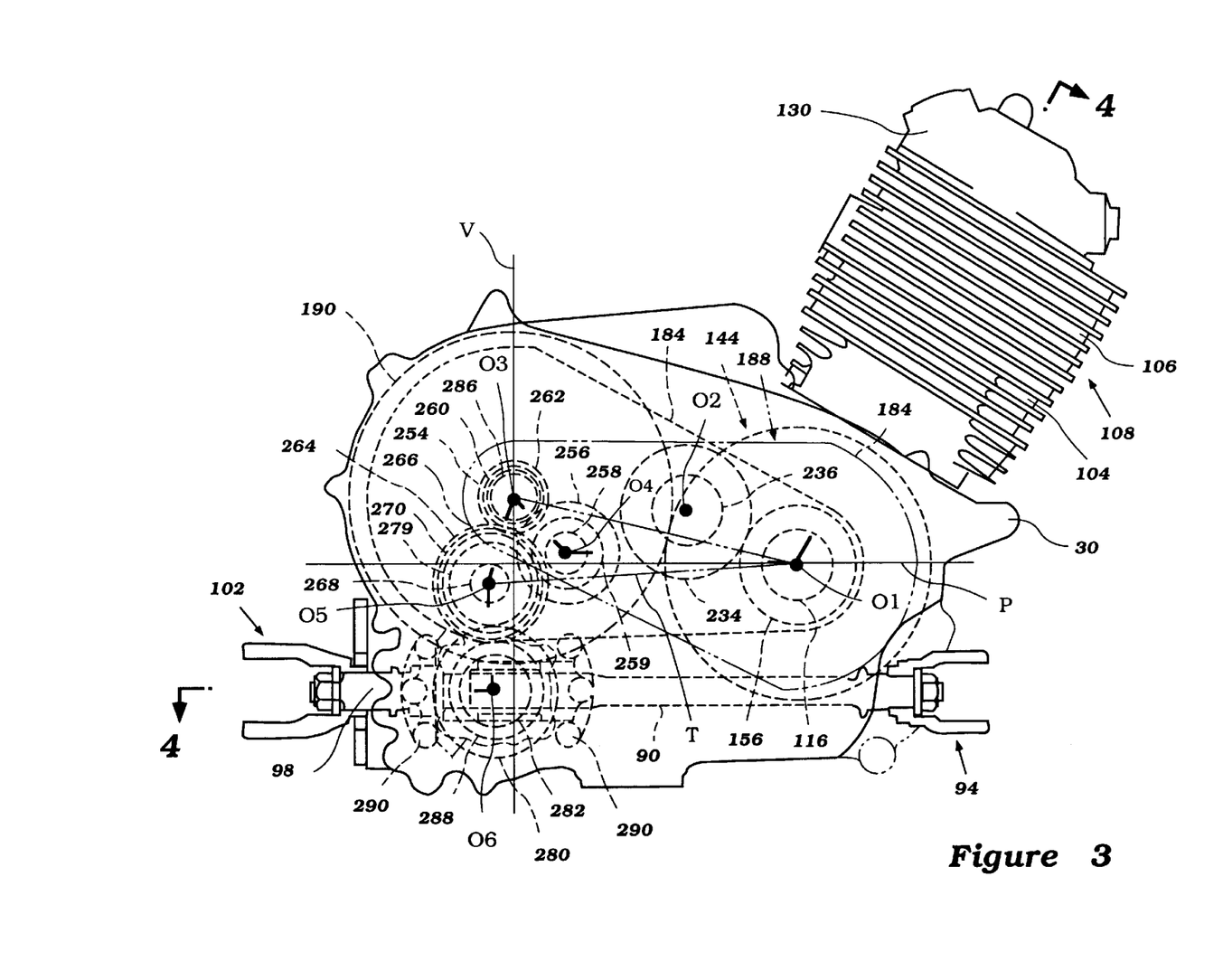
FIG. 3 is a side view of the engine and a transmission of the drive layout of the vehicle illustrated in FIG. 1.

The positions of the belt 184 in these high speed H and low speed L positions is illustrated in FIG. 3. The orientation of the belt 184 with respect to the main shaft 186 in these positions will be described below.

Referring still to FIG. 3, the balancer drive gear 156 drives a balancer gear 234 mounted on a balancer shaft 236. This shaft 236 rotates along an axis O2 which extends parallel to the axis O1, but which is offset therefrom.

Referring to FIGS. 3 and 4, the "V"-belt 184 drives a main shaft 186. The main shaft 186 is rotatably mounted to the transmission cover 148 about an axis O3.

As illustrated in FIG. 4, a fixed sheave 236 is mounted at an outer end of the main shaft 186. Preferably, the fixed sheave 236 is mounted to a flange portion of a sleeve 238 by means of rivets 239 or similar fasteners. Another portion of the sleeve 238 extends over the end of the shaft 186. The sleeve 238 is maintained in positioned along the shaft 186 between a ledge formed on the shaft 196 and the head of an elongate bolt 240 having a shank which extends into the end of the shaft 186.

A moveable sheave 242 is also mounted on the main shaft 186. The moveable sheave 242 is mounted on a flange 244 of a sliding cylinder 246. The sliding cylinder 246 is, in turn, mounted over a sleeve 248 which is positioned on the main shaft 186 between the fixed sheave 236 and a spring stop 248.

It is noted that the fixed and moveable sheaves 236,242 each have conical surfaces facing one another and which engage the belt 184, just as the sheaves 192,202 described above.

A spring 250, such as a helical spring, is positioned between the stop 248 and the moveable sheave 242. The spring 250 biases the moveable sheave 242 into a position near the fixed sheave 236, as illustrated in the low position "L" illustrated in FIG. 4. When the speed of the engine 30, and thus the belt 184 is high, the spring force is overcome, the belt 184 moving the moveable sheave 242 away from the fixed sheave 236 to a high position "H".

Referring to FIG. 3, it may now be seen that in a high position "H" the belt 184 is radially far from the axis O1 along which primary shaft 182 rotates, but radially close to the axis O3 along which main shaft 186 rotates. In this manner, each revolution of the primary shaft 182 effects many rotations of the main shaft 186. On the other hand, in the low position "L" the belt 184 is radially close to the primary shaft 182 but radially far from the main shaft 186. In this manner, each revolution of the primary shaft 182 results in less thin a single revolution of the main shaft 186.

The fixed and moveable sheaves 236,242 are positioned along the main shaft 186 so that they generally align with the first and second sheaves 192,202 mounted on the primary shaft 182. In this manner, the "V"-belt 184 rotates within a plane L3 extending between the two shafts and is not twisted, offset or the like, extending the life of the belt.

As illustrated in FIG. 4, the end of the main shaft 186 which supports the sheaves 236,242 is cantilevered within the transmission chamber 146. The opposing end is rotatably supported by a number of bearings 252. These bearings 252 are preferably supported by the transmission cover 148.

A first gear 254 is mounted on the main shaft 186. This gear 186 is arranged to drive a gear 256 on a countershaft 258. As illustrated in FIG. 3, the countershaft 258 rotates along an axis O4 which is parallel to the axes O1, O2 and O3.

A reverse gear 259 is provided on the countershaft 258. This reverse gear 259 is arranged for selective engagement with a gear 270 on a first transfer shaft 268, as described in more detail below.

Second and third gears 260,262 are also mounted on the main shaft 186. These gears 260,262 are arranged to selectively drive first and second gears 264,266 mounted on the first transfer shaft 268.

As illustrated in FIG. 3, this first transfer shaft 268 rotates about an axis O5. This axis O5 is parallel to axis O4. The first transfer shaft 268 is supported by bearings 278 at each end. These bearings 278 are preferably all supported by the transmission cover 148.

In one position, dog clutches 274,276 on the first transfer shaft 268 are arranged to move the first and second gears 264,266 into engagement with the second and third gears 260,262 on the main shaft 186, and move the gear 270 out of engagement with the reverse gear 259 on the countershaft 258. In this position, the main shaft 186 is arranged to drive the first transfer shaft 268 in a direction which corresponds to a forward driving direction for the vehicle 20. On the other hand, when the dog clutches 274,276 are moved in the opposite direction, the gear 270 is engaged with the reverse gear 259 on the countershaft 258, while the first and second gears 264,266 are moved out of engagement with the main shaft 186, whereby the countershaft 258 drives the first transfer shaft 268 in the reverse direction from the direction of rotation of the main shaft 186. Preferably, a shift lever is provided near the steering handle 40 for use by the operator of the vehicle 20 in shifting the first offset shaft 268 into engagement with the countershaft 258 for driving the vehicle in a reverse direction.

A transfer gear 279 positioned on the first transfer shaft 268 is arranged to drive a mating gear 280 of a second transfer shaft 282. This shaft 282 is rotatably mounted about an axis O6 by a pair of bearings 284. The axis O6 is parallel to the axes O1–O5.

A bevel gear 288 is positioned on the second transfer shaft 282 and driven thereby. This gear 288 drives a mating bevel gear 290 mounted on the main output shaft 90. In this manner, the rotation of the second transfer shaft 282 about the axis O6 is translated ninety degrees to drive the main output shaft 90 which extends along an axis parallel to the centerline C of the vehicle 20.

As stated above, the output shaft 90 then drives the front and rear drive shafts 70,98 to drive the wheels 46,48 in either a forward or rear direction.

Referring now to FIG. 3, additional details of the drive layout and the advantages thereof will be described. First, the axis O3 about which the main shaft 186 rotates is above the horizontal plane P containing the axis O1 about which the crankshaft rotates. In this manner, the "V"-belt 184 can have a desired long length while the length of the transmission 144 is reduced (as compared to the situation where the belt extends horizontally).

The axes O5 and O6 about which the first and second transfer shafts 268,282 rotate are both below the horizontal plane P. In fact, a vertical axis V which passes through the axis O3 about which the main shaft 186 rotates intersects the gears mounted on the first and second transfer shafts 268, 282. The first transfer shaft 268 is also positioned above the second transfer shaft 282. In the embodiment illustrated, the axis O5 about which the first transfer shaft 268 rotates is in the same vertical plane as the axis O6 about which the second transfer shaft 282 rotates. In this manner, the shafts 268,282 are located in a vertical space below and not substantially horizontally outward from the main shaft 260, thus also providing a transmission 144 which is longitudinally short in length.

The axis O2 about which the balancer shaft 236 rotates is provided inside of the path of the "V"-belt 184 in any of its positions, whether in the high H or low L position. Also, the axis O4 about which the countershaft 258 rotates is provided inside of a triangle T which has its corners at the axes O1, O3 and O5. In addition, this axis O4 is provided inside of the path of the "V"-belt in any of its positions, whether in the high or low positions H,L. The positioning of these shafts 236,258 is such that they occupy otherwise empty space in the transmission 144 and are not outside of the other shafts, thereby making the transmission more compact and reducing its size.

Referring to FIG. 5, another advantage of this arrangement is that the main output shaft 90 is at least partially positioned in the oil pool O. Thus, the output shaft 90 is well lubricated. As also illustrated therein, the upper portion of the output shaft 90 is positioned higher than the lower portion of the sleeves 192,202 (see line H). This is a compact arrangement, since the output shaft 90 is not positioned so high that the height of the transmission 144 is reduced.

Referring to FIG. 4, it may be seen that the axis L2 through the cylinder 108 is offset to one side of the centerline C of the vehicle 20 in the opposite direction from the axis L3 along which the "V"-belt 184 rotates. In this manner, the engine 30 and transmission 144 are balanced on either side of the centerline C of the vehicle 20, providing greater stability in the side-to-side direction.

As also illustrated in this figure, the camshaft drive is positioned on the side of the engine 30 opposite the end of the crankshaft 116 which drives the clutch 155. In other words, the cam chain 134 extends along an axis and is driven by the crankshaft 116 an a side thereof opposite axis L2 from the axis L1. In this manner, the cylinder 108 (and thus the piston 110 and the majority of the weight of the engine 30) can be positioned closer to the centerline C of the vehicle 20.

Of course, the foregoing description is that of preferred embodiments of the invention, and various changes and modifications may be made without departing from the spirit and scope of the invention, as defined by the appended claims.

What is claimed is:

1. A drive layout for an offroad vehicle having a frame, at least two wheels supporting said frame, an internal combustion engine supported by said frame, said engine having at least one cylinder, a piston positioned in said cylinder and reciprocating along a first axis, said piston driving an output shaft of said engine, said output shaft arranged to drive at least one of the wheels through said transmission, said vehicle having a longitudinal centerline, said output shaft of said engine extending transverse to said centerline, said transmission including a main shaft driven by said output shaft by a belt extending along a second axis, said main shaft driving a drive shaft, said drive shaft extending parallel to said centerline and arranged to drive said at least one of said wheels, said first axis and second axis positioned on opposite sides of said centerline.

2. The drive layout in accordance with claim 1, wherein said drive shaft extends along said centerline.

3. The drive layout in accordance with claim 1, wherein said output shaft has a first end selectively driving a primary shaft through a clutch, said primary shaft arranged to drive said main shaft with said belt, wherein at least a portion of said drive shaft is positioned below said clutch.

4. The drive layout in accordance with claim 3, wherein a drive sheave which engages said belt is positioned on said primary shaft and at least a portion of said drive shaft is positioned higher than a portion of said sheave in the vertical direction.

5. The drive layout in accordance with claim 3, wherein at least a portion of said drive shaft is positioned in said a clutch housing in which said clutch is positioned.

6. The drive layout in accordance with claim 1, wherein said engine includes a camshaft and flexible drive means extending along a third axis between said crankshaft and said camshaft, whereby said crankshaft drives said camshaft, said third axis positioned opposite said first axis from second axis.

7. The drive layout in accordance with claim 1, wherein said transmission includes a housing defining a transmission chamber, wherein an oil pool is provided in said chamber and at least a portion of said drive shaft is positioned in said oil pool.

8. A drive layout for a vehicle having a frame rollably supported by at least two wheels, said vehicle having a longitudinal centerline therethrough, an internal combustion engine having a body defining at least one cylinder, said engine supported by said frame, said cylinder having a central axis, a piston reciprocally mounted in said cylinder along said central axis, said piston connected to a crankshaft, said crankshaft extending transverse to said centerline and arranged to drive at least one of said wheels through a transmission, said transmission including a primary shaft driven by said crankshaft, a main shaft offset from said primary shaft and driven by said primary shaft by a flexible transmitter, said flexible transmitter extending along a flexible transmitter axis, said main shaft driving an output shaft, said output shaft driving at least one drive shaft arranged to drive said at least one of said wheels, said belt axis positioned on an opposite side of said centerline from said central axis.

9. The drive layout in accordance with claim 8, wherein said transmission includes a housing defining a transmission chamber, said chamber having an oil pool, said output shaft positioned at least partially in said oil pool.

10. The drive layout in accordance with claim 8, wherein a clutch is provided between said crankshaft and primary shaft.

11. The drive layout in accordance with claim 10, wherein at least a portion of said output shaft is provided below said clutch.

12. The drive layout in accordance with claim 8, wherein at least one sheave is provided on said primary shaft for engaging said flexible transmitter and at least a portion of said output shaft is provided radially closer to said primary shaft than a portion of said sheave.

13. The drive layout in accordance with claim 8, wherein said engine includes at least one valve and a camshaft for operating said at least one valve, a second flexible transmitter driven by said crankshaft and driving said camshaft, said second flexible transmitter extending along a drive axis, said drive axis positioned to an opposing side of said central axis from said centerline.

* * * * *